Feb. 14, 1933.                L. G. SIMJIAN                1,897,772
POSE REFLECTING PHOTOGRAPHIC APPARATUS
Filed July 26, 1928
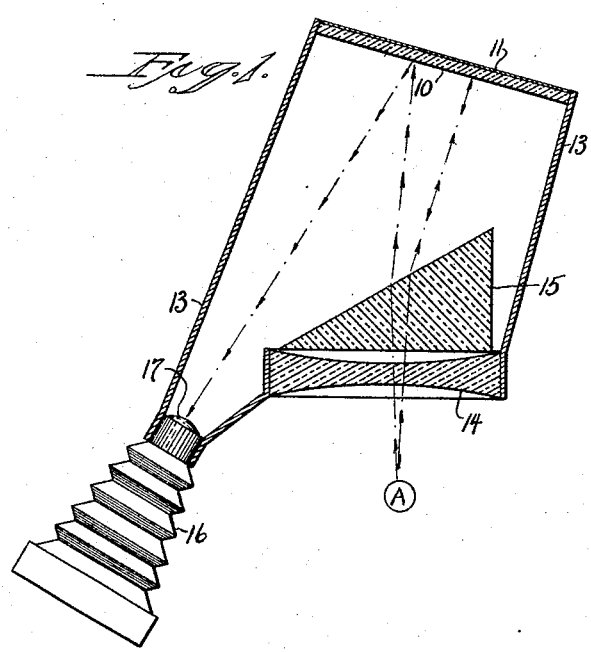
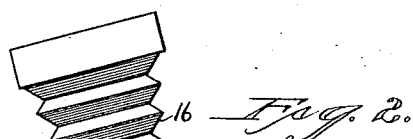
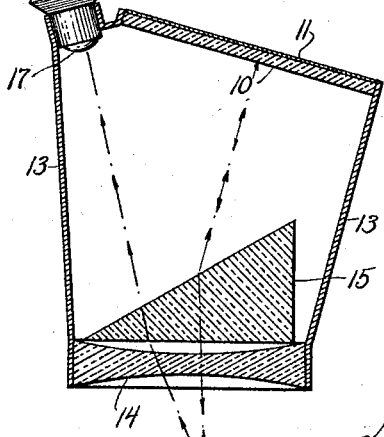

Patented Feb. 14, 1933

1,897,772

UNITED STATES PATENT OFFICE

LUTHER G. SIMJIAN, OF NEW HAVEN, CONNECTICUT

POSE-REFLECTING PHOTOGRAPHIC APPARATUS

Application filed July 26, 1928. Serial No. 295,566.

This invention relates to an improvement in pose-reflecting photographic apparatus and particularly to pose-reflecting photographic apparatus designed for use in connection with automatic and semi-automatic photographic machines, though not so limited.

The object of this invention is to provide a simple and convenient pose-reflecting photographic apparatus which will enable a person being photographed to observe, before his photograph is taken, a reflection of substantially the identical image which a camera will record when operated, so that he may be guided in assuming a pose suitable to his taste; the said apparatus being constructed with particular reference to minimizing distortion, both as regards the image recorded by the camera and the image reflected to the poser.

With this object in view, my invention consists in a pose-reflecting photographic apparatus characterized by a camera, a pose-reflecting surface, and a transparent light-deflecting member interposed between both the said camera and the said pose-reflecting surface in position to deflect either directly or indirectly the light reflected from the poser to both the latter elements; the said pose-reflecting surface being positioned to reflect the image deflected to it by the said light-deflecting member back to the poser; whereby the image of the poser is deflected to both the said camera and to the said reflecting surface for recording by the former a reflection back to the poser by the latter.

My invention further consists in a pose-reflecting photographic apparatus characterized as above and having certain details of construction and combinations of parts as will be hereinafter described and particularly recited in the claims.

In the accompanying drawing:

Fig. 1 is a schematic sectional view showing one form which my improved pose-reflecting photographic apparatus may assume; and Fig. 2 is a corresponding view showing another form which my invention may assume.

In carrying out my invention as shown in Fig. 1, I employ an obliquely-disposed pose-reflecting mirror 10 preferably made of glass having a reflecting-coating 11 and located at the rear end of a hood or shield 13 which latter has positioned in its forward end an image-reducing lens 14 commonly called a "minus" lens and as shown interposed between the poser represented by the circle A, and the said pose-reflecting mirror.

Positioned directly back of the image-reducing lens 14 I locate a prism 15 which deflects the image of the poser to the right upon the obliquely-disposed mirror 10 aforesaid, from which latter it is reflected backward through the said prism and image-reducing lens to the poser, as well as to a camera 16 positioned to one side of the image-reducing lens 14 and having the outer end of its lens-system 17 directed at the said mirror.

The pose-reflecting mirror 10 is guarded against receiving light other than that passing through the outer face of the prism 15, by the aforesaid hood or shield 13.

By means of the arrangement shown I am enabled to cause the camera 16 to record a photograph of the poser which will be accurate and undistorted by the angular disposition of the various elements, which latter arrangement enables me to compactly and conveniently arrange the parts to accommodate various other portions of an automatic or semi-automatic photographic machine, in connection with which my improved pose-reflecting apparatus is especially intended for use, though as above noted it is also available for use in other situations.

By means of the arrangement shown and above described, not only does the camera record an accurate and undistorted image of the poser, but the poser himself sees a clear and undistorted reflection of himself in the pose-reflecting mirror 10.

In Fig. 2 of the drawing the same elements are present as in the arrangement previously described and bear corresponding numbers, but in this instance the camera, instead of having the outer end of its lens-system 17 directed at the pose-reflecting mirror 10, it is directed at the prism 15, as clearly shown in the said figure.

In this last described arrangement of parts the effect is substantially the same, insofar as the camera and the poser both receive undistorted impressions of the subject or poser.

The minus or image-reducing lens 14 shown in the drawing is preferably employed to reduce the reflected image of the poser to such proportions that it may be readily "taken in," so to speak, at a glance, though I wish to have it understood that my invention is not limited to the employment of means for reducing the reflected image.

In both of the arrangements shown and described the prism 15 acts to deflect the image of the poser to both the mirror and the camera. In the construction shown in Fig. 1 the image is deflected by the said prism onto the mirror 10 before being reflected to the camera, while in the construction shown in Fig. 2 the image is deflected by the prism 14 directly into the camera as well as directly upon the pose-reflecting mirror.

I claim:

1. A pose-reflecting photographic apparatus, comprising a camera; a pose-reflecting surface; and a transparent light-deflecting member interposed in the light-path between the poser and both the said camera and the said pose-reflecting surface in position and of a character to deflect the light reflected from the poser to both the latter elements; the said pose-reflecting surface being positioned to reflect the image deflected to it by the said light-deflecting member back to the poser; whereby the image of the poser is deflected to both the said camera and to the said reflecting surface for recording by the former a reflection back to the poser by the latter.

2. A pose-reflecting photographic apparatus, comprising a camera; a pose-reflecting surface; and a prism interposed in the light-path between the poser and both the said camera and the said pose-reflecting surface in position and of a character to deflect the light reflected from the poser to both the latter elements; the said pose-reflecting surface being positioned to reflect the image deflected to it by the said prism back to the poser; whereby the image of the poser is deflected to both the said camera and to the said reflecting surface for recording by the former a reflection back to the poser by the latter.

3. A pose-reflecting photographic apparatus, comprising a camera; a pose-reflecting surface; a transparent light-deflecting member interposed between the poser and both the said camera and the said pose-reflecting surface in position and of a character to deflect the light reflected from the poser to both the latter elements; the said pose-reflecting surface being positioned to reflect the image deflected to it by the said light-deflecting member back to the poser; and a shield laterally enveloping the light-paths between the said light-deflecting member and the said camera and reflecting surface to prevent light other than that passing through the said light-deflecting member from impinging upon the said camera and pose-reflecting surface.

In testimony whereof, I have signed this specification.

LUTHER G. SIMJIAN.